(12) United States Patent
Elmose et al.

(10) Patent No.: US 10,927,819 B2
(45) Date of Patent: Feb. 23, 2021

(54) MONITORING A BLADE BEARING

(71) Applicant: Siemens Gamesa Renewable Energy A/S, Brande (DK)

(72) Inventors: Soeren Forbech Elmose, Bording (DK); Troels Kildemoes Moeller, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 58 days.

(21) Appl. No.: 16/224,874

(22) Filed: Dec. 19, 2018

(65) Prior Publication Data
US 2019/0211805 A1 Jul. 11, 2019

(30) Foreign Application Priority Data

Jan. 11, 2018 (EP) .................................. 18151224

(51) Int. Cl.
| | |
|---|---|
| *F03D 3/06* | (2006.01) |
| *F03D 17/00* | (2016.01) |
| *F03D 80/70* | (2016.01) |
| *F03D 7/02* | (2006.01) |
| *G01M 13/045* | (2019.01) |

(52) U.S. Cl.
CPC ........... *F03D 17/00* (2016.05); *F03D 7/0224* (2013.01); *F03D 80/70* (2016.05); *G01M 13/045* (2013.01); *F05B 2260/79* (2013.01); *F05B 2260/80* (2013.01); *F05B 2270/328* (2013.01); *F05B 2270/334* (2013.01); *F05B 2270/807* (2013.01); *F05D 2270/334* (2013.01)

(58) Field of Classification Search
CPC ........ F03D 7/0224; F03D 17/00; F03D 80/70; G01M 13/045; F05B 2240/50; F05B 2260/80; F05B 2270/334
See application file for complete search history.

(56) References Cited

U.S. PATENT DOCUMENTS

| | | | | |
|---|---|---|---|---|
| 8,876,477 | B2* | 11/2014 | Bech ..................... | F03D 1/0658 |
| | | | | 416/174 |
| 9,423,290 | B2* | 8/2016 | Sakaguchi ............. | G01H 1/003 |
| 9,733,154 | B2* | 8/2017 | Campbell ........... | G01M 13/045 |

(Continued)

FOREIGN PATENT DOCUMENTS

| | | |
|---|---|---|
| CN | 201844920 U | 5/2011 |
| CN | 202547923 U | 11/2012 |

(Continued)

OTHER PUBLICATIONS

European Search Report for Application No. 18151224.5, dated Jul. 16, 2018.

(Continued)

*Primary Examiner* — Ninh H. Nguyen
(74) *Attorney, Agent, or Firm* — Schmeiser, Olsen & Watts LLP

(57) ABSTRACT

A method of monitoring a blade pitch bearing of a rotor blade of a wind turbine is provided, the method including: pitching the rotor blade; measuring an amount of a vibration of the blade pitch bearing during the pitching; estimating a condition of the blade pitch bearing based on the measured amount of vibration. Also disclosed is an arrangement for monitoring a blade pitch bearing, a rotor blade bearing and a wind turbine.

16 Claims, 7 Drawing Sheets

(56) References Cited

U.S. PATENT DOCUMENTS

2017/0108406 A1* 4/2017 Thomson ............ G01M 13/045
2018/0347548 A1* 12/2018 Potter .................... F03D 17/00

FOREIGN PATENT DOCUMENTS

| CN | 103091105 A | 5/2013 |
| CN | 106246463 A | 12/2016 |
| EP | 2522977 A1 | 11/2012 |
| EP | 2626683 A1 | 8/2013 |
| EP | 3260836 A1 | 12/2017 |

OTHER PUBLICATIONS

Non-English Chinese Office Action for Application No. 201910027135. X, dated Mar. 13, 2020.

* cited by examiner

MONITORING A BLADE BEARING

CROSS-REFERENCE TO RELATED APPLICATIONS

This application claims priority to European Application No. 18151224.5, having a filing date of Jan. 11, 2018, the entire contents of which are hereby incorporated by reference.

FIELD OF TECHNOLOGY

The following relates to a method and arrangement for monitoring a blade pitch bearing of a rotor blade of a wind turbine, a rotor blade bearing for a rotor blade, a rotor blade having the rotor blade bearing and further relates to a wind turbine.

BACKGROUND

A wind turbine may comprise a wind turbine tower, a nacelle mounted on top of the wind turbine tower comprising a generator which is driven by a rotating rotor shaft at which plural rotor blades are mounted.

For appropriately adjusting the rotor blades with respect to the wind, the rotor blades comprise a pitching system which enables to rotate the rotor blades around a longitudinal axis for setting an appropriate pitch angle. Therefore, the rotor blades comprise a blade pitch bearing rotatably supporting an airfoil of the rotor blades relative to a portion of the blade pitch bearing which is connected to a hub of the wind turbine. Over prolonged operation of the wind turbine, the blade pitch bearing may gradually deteriorate. Therefore, condition monitoring of a blade pitch bearing is conventionally performed.

The condition monitoring of the blade pitch bearing conventionally comprises checking for steel particles in grease samples at service intervals. In addition, conventionally check for blade pitching errors has also been a part of the monitoring but has either been very unprecise and/or has been a very late indication of blade bearing damages leading to not optimal planning for repair work. In particular, if the bearing experiences a very high increase in frictional moment due to a progressed damage, correct blade pitching might not be possible leading to a pitching error. Thus, the conventional condition monitoring methods for monitoring blade bearing are either unprecise or require manual intervention including the requirements of maintenance personnel.

Thus, there may be a need for a method and arrangement of monitoring a blade pitch bearing of a rotor blade of a wind turbine and there may be also a need for a rotor blade bearing for a rotor blade and a wind turbine, which enable simple and precise blade pitch bearing monitoring, in particular allowing to maintain normal production operation of the wind turbine.

SUMMARY

According to an embodiment of the present invention it is provided a method of monitoring a blade pitch bearing of a rotor blade of a wind turbine, the method comprising pitching the rotor blade; measuring an amount of a vibration of (at least a portion of) the blade pitch bearing during the pitching; estimating a condition of the blade pitch bearing based on the measured amount of vibration.

The method may for example be performed by a wind turbine controller or a wind park controller. The method may be implemented partly in software and/or hardware. Together with the blade pitch bearing, the rotor blade may be connected to a hub of the wind turbine. The blade pitch bearing may rotationally support an airfoil of the rotor blade relative to a portion which is fixedly connected to the hub of the wind turbine.

The blade pitch bearing may allow rotating the airfoil of the rotor blade around a longitudinal direction relative to the hub or relative to a fixed portion of the blade pitch bearing or the rotor blade. The blade pitch bearing may comprise a roller bearing and/or a ball bearing. The bearing may comprise an inner ring and an outer ring and plural rollable elements arranged between the inner ring and the outer ring, allowing to rotate the inner ring with respect to the outer ring. The airfoil may be fixedly connected either to the inner ring or to the outer ring and either the inner ring or the outer ring may fixedly be connected to the hub of the wind turbine. Further, the blade pitch bearing may comprise lubricant filled between the inner ring and the outer ring and around the rollable elements. The rollable elements may have a cylinder shape, a spherical shape or a cone shape.

Pitching the rotor blade may comprise to rotate the rotor blade around a longitudinal axis of the rotor blade by a particular angle range, such as in an angle range of 30°, or 60° or 90°, for example. The pitching speed during the pitching may be constant or may not be constant. For example, the pitching speed may increase from substantially zero to a maximal value and then decrease to zero again.

Depending on a degree of damage or degradation, pitching the rotor blade may induce or excite vibration in portions of the blade pitch bearing, for example in the inner ring and/or the outer ring. The induced vibrations may be characteristic for the kind or degree of damage of the blade pitch bearing and may also be characteristic of the geometrical and structural properties of the blade pitch bearing, such as dependent on resonances of the inner ring and/or the outer ring of the bearing.

Measuring the amount of the vibration may be realized by using one or more vibration sensors, such as accelerometers, which may be mounted at one more positions of the blade pitch bearing and/or the rotor blade and/or for example mounted at the hub. Measuring the amount of vibration may comprise to acquire and store multiple samples of a measuring signal of a vibration sensor over the time span in which the rotor blade is pitched. The amount of vibration may in particular be monitored (e.g. sampled and/or recorded) over time at a relative high frequency such as sampled with a frequency between 500 Hz and 10000 Hz, for example.

The condition of the blade pitch bearing may be characterized for example by a kind and/or degree of damage (e.g. of the raceway of the bearing and/or the rollable elements) or a degree of integrity of the blade pitch bearing. For example, if the amount of vibration (in particular in a particular frequency range) increases above a threshold, the blade pitch bearing may be diagnosed to have a degree of damage which may require planning of replacement within a certain time horizon of the blade pitch bearing. Conversely, if the measured amount of vibration (in particular in the particular frequency range) is below the threshold, the blade pitch bearing may be diagnosed to have a sufficient degree of integrity such that continuing operation without replacement within a short time horizon is possible.

According to an embodiment of the present invention, the estimating the condition includes comparing the amount of a vibration with a threshold. The threshold (or the one or more thresholds for different frequency ranges or frequencies) may be stored in an electronic storage. Thereby, a simple method for monitoring the blade pitch bearing and further for diagnosing the blade pitch bearing may be provided.

According to an embodiment of the present invention, the threshold depends on a loading the bearing is subjected to during the pitching. Different loadings may for example be effected by different wind conditions or wind speeds and different azimuthal angles of the hub and thus orientations of the rotor blade whose bearing is monitored. The bearing loading is distributed inside the bearing meaning that rollers/balls at different portions are carrying the load. At some azimuth angles "bad" raceway portions suffering from initial damage and/or damaged balls/rollers, are higher loaded creating more vibration/noise.

For example, when the rotor blade vertically points downwards the inside loading of "bad" raceway portions during pitching may be minimal or non-existing leading to no elevated vibration level. Conversely, if the rotor blade is arranged with its longitudinal axis substantially horizontally oriented, the inside loading of "bad" raceway portions during the pitching may be maximal leading to elevated vibration. Defining different thresholds for different loadings may also enable to monitor the bearing irrespective at which azimuthal position the bearing is arranged or which environmental condition is prevailing.

According to an embodiment of the present invention, the method further comprises monitoring an azimuthal position or azimuthal range in which the pitching is performed, in particular binning the amount of vibration in one or more azimuthal ranges covered during the pitching; comparing the amount of a vibration or amount of vibration averaged in the respective azimuthal range with a threshold dependent on the respective azimuthal position or the azimuthal range.

The azimuthal position or the azimuthal range in which the pitching is performed may be stored together (e.g. associated) with the measured amount of vibration during the pitching. In particular, during the pitching, the respective azimuthal position may be associated with the respective measured amount of vibration such that the measuring results in plural tuples comprising the azimuthal position associated with the measured amount of vibration. According to an embodiment of the present invention a mean value of the vibration (e.g. average over several measurements) for a particular azimuth position (e.g. 27° within a bin, for example the bin covering angles from 0° to 45°) during the pitching is obtained. The mean value of the vibration obtained at azimuth position (e.g. 27°) may be used for the binning of vibration value in the azimuth bin e.g. 0° to 45°.

The azimuthal ranges may also be referred to as azimuthal bins. For example, azimuthal bins may be defined for example from 0° to 10°, from 10° to 20°, from 20° to 30° and so forth. The measured vibration while in each of the defined bins may be averaged and associated with the corresponding azimuthal bin. To each azimuthal bin, a respective threshold may be also associated and the averaged vibration in a particular bin may be compared with the corresponding threshold. For example, if more than a threshold number of vibrations are above the respective bin thresholds, the rotor blade bearing may be diagnosed to have a degree of damage which may require replacement. A diagnosing logic may be defined taking into account the averaged vibrations within each bin and the respective thresholds for each of the azimuthal bins. Thereby, accurate condition monitoring of a blade pitch bearing may be achieved.

According to an embodiment of the present invention, measuring the amount of a vibration includes: measuring vibration over a frequency range, in particular between 0 Hz and 1000 Hz, analysing the measured vibration over the frequency range, to determine magnitudes of vibration components of vibration for plural vibration frequencies, in particular by Fourier transformation of a measured vibration.

Due to pitching the rotor blade, vibrations may be excited or induced at plural frequencies. Thus, a frequency analysis of the measured amount of vibrations may be performed to determine for each frequency an amplitude corresponding to the strength of the vibration of this particular frequency. Analysis or evaluation of the vibration components or magnitudes of the vibration components may simplify the method and may enable to arrive at a more precise or accurate condition monitoring or diagnosing of the rotor blade bearing.

According to an embodiment of the present invention, estimating the condition comprises: averaging magnitudes of the vibration components over a predetermined frequency range, wherein the frequency range is between 100 Hz and 140 Hz, further and/or wherein the frequency range includes at least one resonance frequency of the pitch bearing. The frequency range over which the magnitudes of the vibration components are averaged may be selected depending on the geometry, the material and the construction of the blade pitch bearing, in particular the inner ring and/or the outer ring. The inner ring or the outer ring may comprise particular resonance frequencies being characteristic for these structures. Analyzing primarily ranges including the resonance frequency of the pitch bearing, in particular the inner ring or the outer ring, may simplify the method.

According to an embodiment of the present invention, pitching the blade is performed while the rotor rotates with a rotational speed less than a threshold rotational speed, in particular between less than 5 rpm, or less than 3 rpm or less than 1 rpm, or stands still. The method may not require to completely shutdown the wind turbine but may be performed when occasionally the wind speed is very low such that the rotor rotates with a relatively low rotational speed. Further, the method may not require that the rotor blade whose blade pitch bearing is to be monitored is in a particular azimuthal position, since the azimuthal position the rotor blade is in during the pitching is also taken into account according to embodiments of the present invention.

According to an embodiment of the present invention, pitching the blade includes pitching the pitch angle across an angle range to a particular between 0° and 90°, in particular in duration between 5 s and 50 s, measuring the vibration during the pitching and averaging the measured vibration over the duration during which the pitch angle was pitched across the angle range. Further the averaged vibration may then be associated with an azimuthal bin in which an average (mean) of the azimuthal position or positions falls or is even a center. The angle range may be fixed for all azimuthal positions. The angle range may be a parameter to be set depending on operational and/or environmental conditions and/or the particular application.

If the rotor blade stands still during the pitching, the measured vibration may be averaged over the whole pitching time and associated with the single azimuthal position. If, however, the rotor blade is (slowly) rotating during the pitching, a bin averaging of the measured vibrations in plural azimuthal bins may be performed.

No matter the rotor stands still or rotates slowly the measured vibrations may be averaged during the pitching sequence. Then the mean azimuth orientation (e.g 27 degrees) may be determined and then the recorded vibration level may be put in the relevant bin e.g. 0-45 degrees. Furthermore, the bin averaged vibrations may be compared with the bin specific thresholds, as explained above.

In other embodiments additionally the standard deviation for the azimuth position is measured or considered to secure that the rotor speed has been very low and that azimuth position has not changed much (similar of having the very low speed such as <3 rpm).

The mean value of azimuth position e.g. 27 degrees may be used for the binning of vibration value in the azimuth bin e.g. 0-45 degrees.

According to an embodiment of the present invention, pitching the blade in the pitch angle range is performed several times and the measured vibration are averaged. The averaging may reduce measurement noise and may therefore improve the accuracy of the monitoring method.

According to an embodiment of the present invention, the pitching the blade includes fixing pitch angles of all other blades. Thus, at a time, only one of the blades is pitched, while all the others do not change their pitching angles. Thereby, disturbance by vibrations induced by other rotor blades may be avoided, resulting in an improved condition monitoring method. In other embodiments, cross-talk between vibrations induced in different rotor blades may be relatively small or even actively be damped. In these situations, simultaneously, several rotor blades may be pitched while the amount of vibration is measured for each of the rotor blades.

According to an embodiment of the present invention, the amount of a vibration is measured using at least one accelerometer arranged at a hub of a rotor at which the rotor blade is mounted, and/or at the blade pitch bearing, in particular on an inner ring and/or at an outer ring of the bearing. The accelerometer may be adapted to measure acceleration in at least one dimension, or in two dimensions or even in three dimensions. The accelerometer may be arranged at the hub or at the blade pitch bearing in such an orientation that the direction along which the acceleration is measured substantially coincides with an expected main vibration direction of the hub or the rotor blade bearing.

It should be understood that features, individually or in any combination, disclosed, described or explained for a method of monitoring a blade pitch bearing of a rotor blade of a wind turbine, also apply, individually or in any combination, to an arrangement for monitoring a blade pitch bearing according to embodiments of the present invention and vice versa.

According to an embodiment of the present invention it is provided an arrangement for monitoring a blade pitch bearing of a rotor blade of a wind turbine, the arrangement comprising a pitching system adapted to pitch the rotor blade; a vibration sensor adapted to measure an amount of a vibration of (e.g. at least a portion of) the blade pitch bearing during the pitching; a processor adapted to estimate a condition of the blade pitch bearing based on the measured amount of vibration. The arrangement may be configured to carry out a method of monitoring a blade pitch bearing according to an embodiment of the present invention. The arrangement may for example be comprised in a wind turbine controller or a wind park controller.

According to an embodiment of the present invention it is provided a rotor blade bearing for a rotor blade comprising: an inner ring; an outer ring; plural rollable elements arranged between the inner ring and the outer ring, allowing to rotate the inner ring with respect to the outer ring; at least one accelerometer arranged at the inner ring and/or at the outer ring. The inner ring of the bearing may have a diameter between 2 m and 5 m, for example. The at least one accelerometer may in particular comprise at least two accelerometers which may be arranged at the inner ring and/or the outer ring at opposite positions (for example spaced apart from each other by 180°). The rotor blade bearing may advantageously be condition monitored by methods according to embodiments of the present invention.

According to an embodiment of the present invention it is provided a rotor blade having the rotor blade bearing described above.

Further, according to an embodiment of the present invention it is provided a wind turbine comprising at least one rotor blade having a rotor blade bearing according to the above explained embodiments and in particular also having an arrangement for monitoring a blade pitch bearing according to one of the above-mentioned embodiments.

The aspects defined above and further embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like numbers, wherein:

FIG. 1 schematically illustrates a wind turbine according to an embodiment of the present invention;

FIG. 2 schematically illustrates a side view of a rotor blade bearing according to an embodiment of the present invention;

FIG. 3 schematically illustrates an azimuthal orientation of a rotor blade considered during condition monitoring according to embodiments of the present invention;

FIG. 4 illustrates a graph showing measured vibrations of the rotor blades as oriented according to FIG. 3;

FIG. 5 schematically illustrates an azimuthal orientation of a rotor blade considered during condition monitoring according to embodiments of the present invention;

FIG. 6 illustrates a graph showing measured vibrations of the rotor blades as oriented according to FIG. 5;

FIG. 7 schematically illustrates an azimuthal orientation of a rotor blade considered during condition monitoring according to embodiments of the present invention;

FIG. 8 illustrates a graph showing measured vibrations of the rotor blades as oriented according to FIG. 7;

FIG. 9 schematically illustrates an azimuthal orientation of a rotor blade considered during condition monitoring according to embodiments of the present invention;

DETAILED DESCRIPTION

Figure 1:
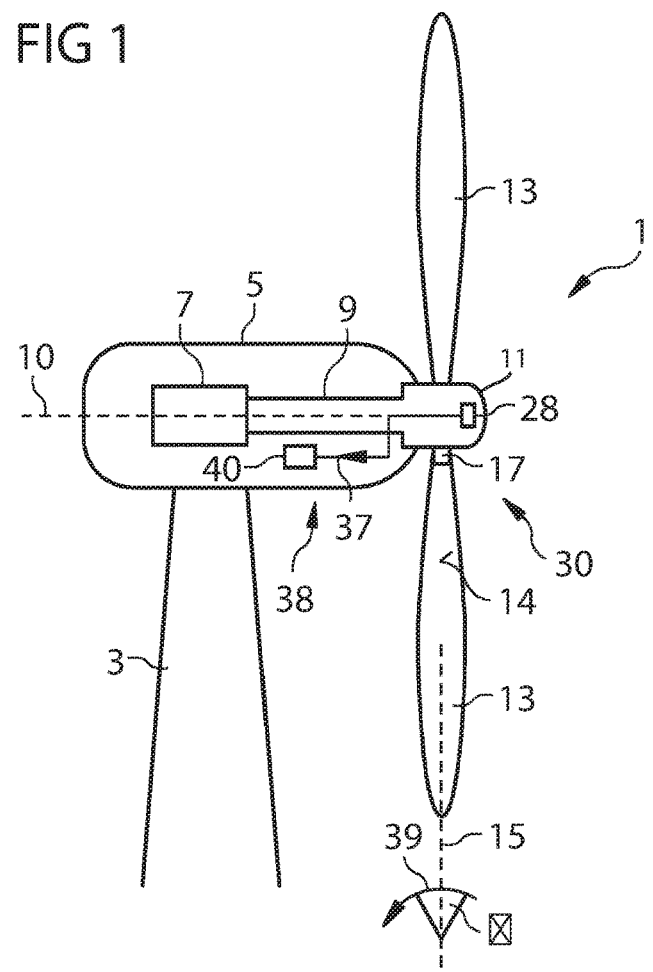

The wind turbine 1 schematically illustrated in FIG. 1 comprises a wind turbine tower 3, a nacelle 5 mounted on top of the wind turbine tower which harbours a generator 7 having a rotation shaft 9 which is coupled to a hub 11 at which plural rotor blades 13 are mounted. At least one rotor blade 13 of the wind turbine 1 comprises a rotor blade bearing 17 according to an embodiment of the present invention which enables to rotate an air foil 14 of the rotor blade 13 around a longitudinal axis 15 relative to the hub 11.

Figure 2:
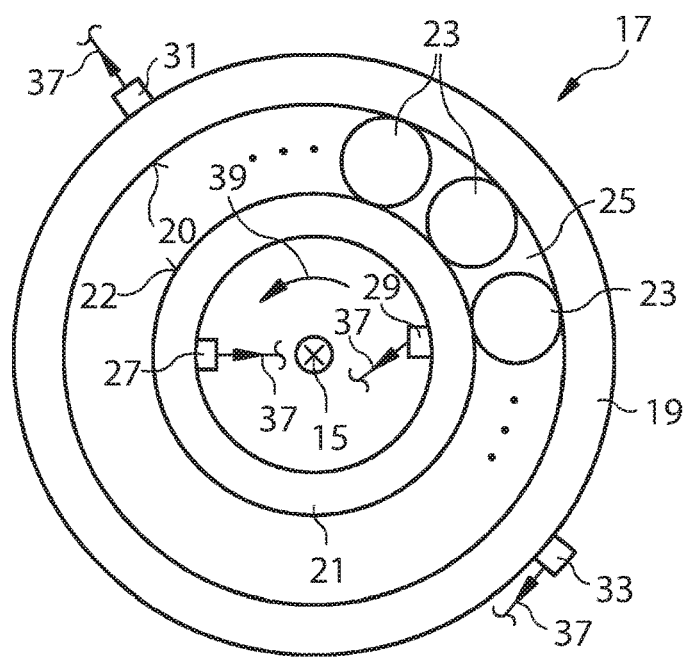
Figure 3:
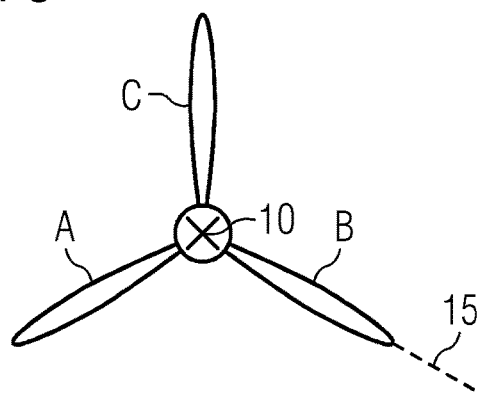
Figure 4:
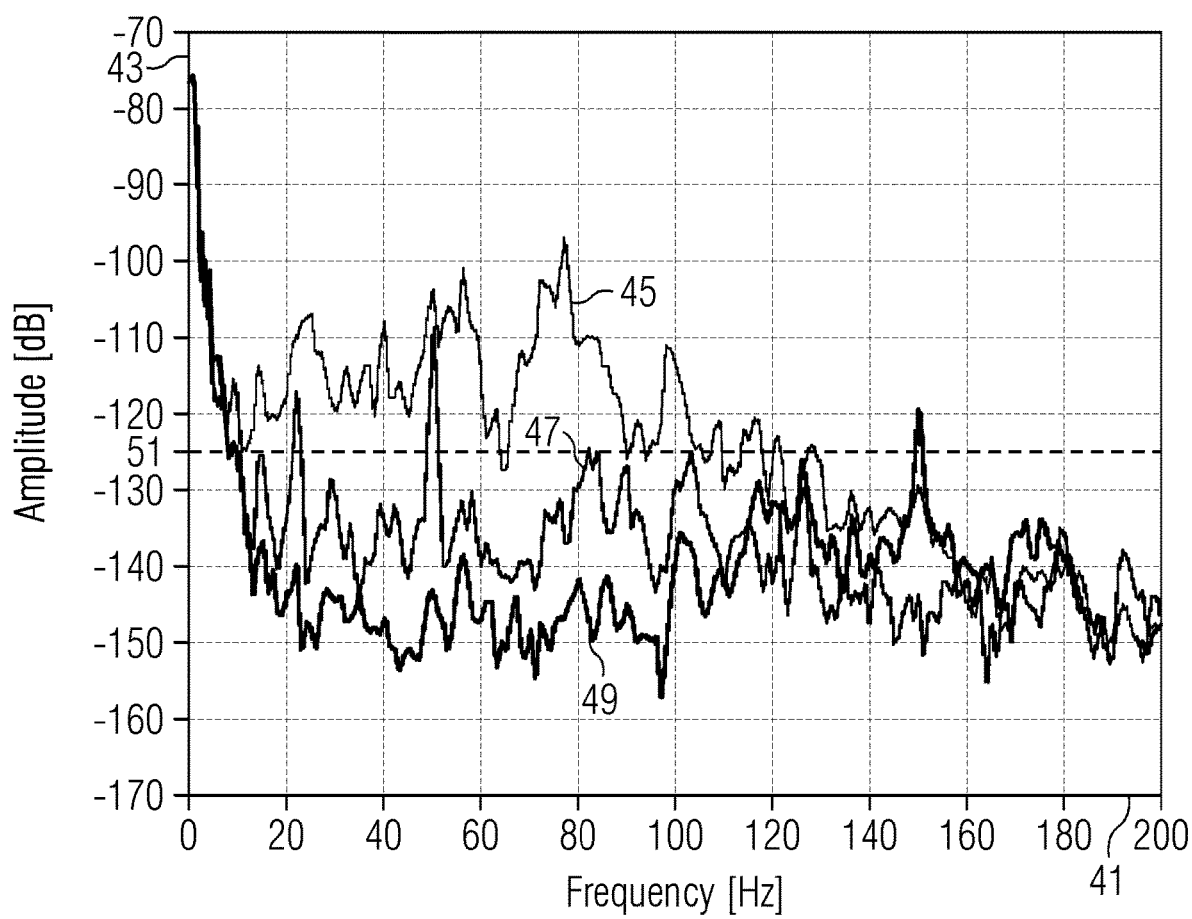
Figure 5:
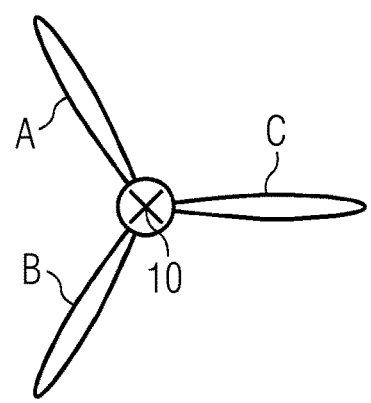
Figure 6:
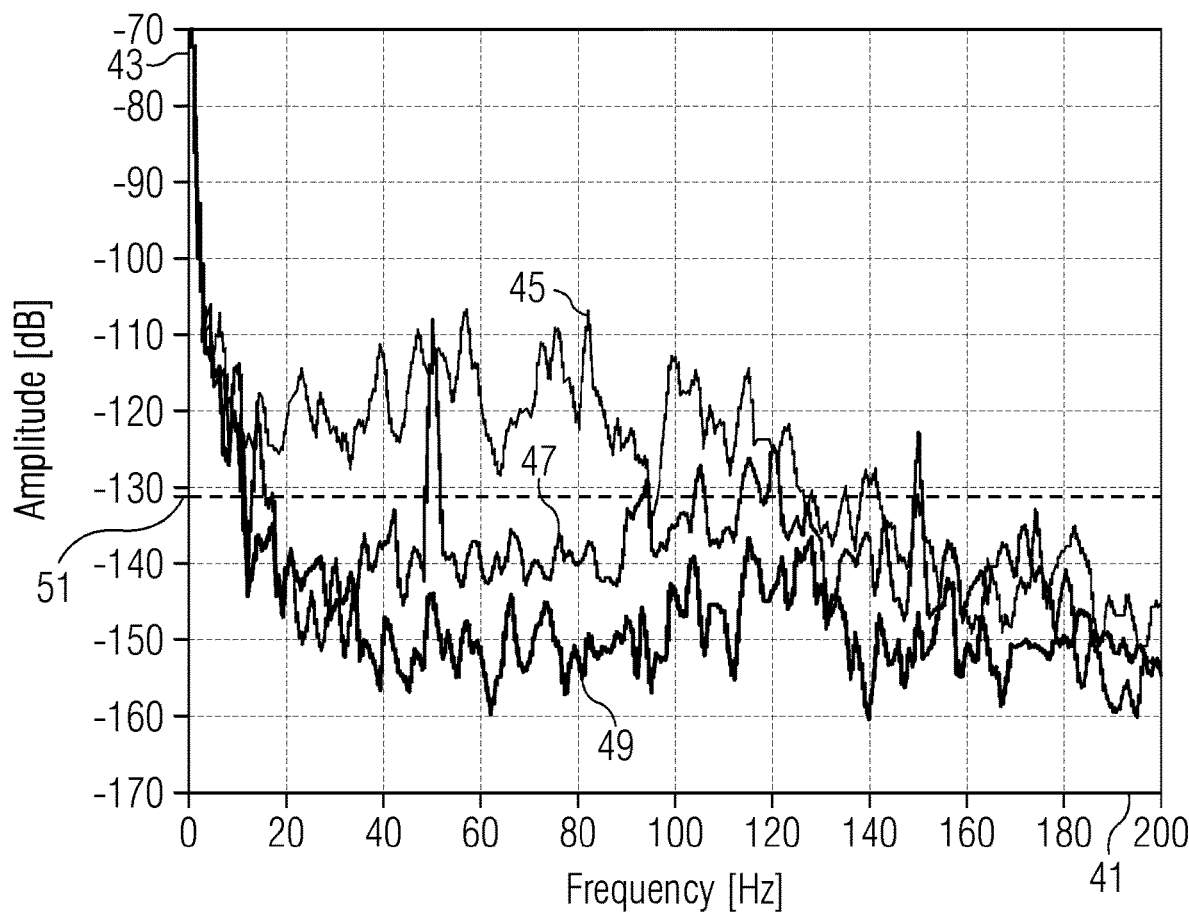
Figure 7:
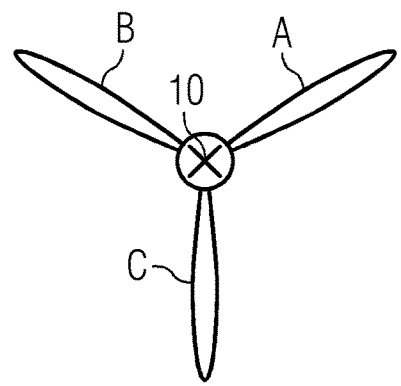
Figure 8:
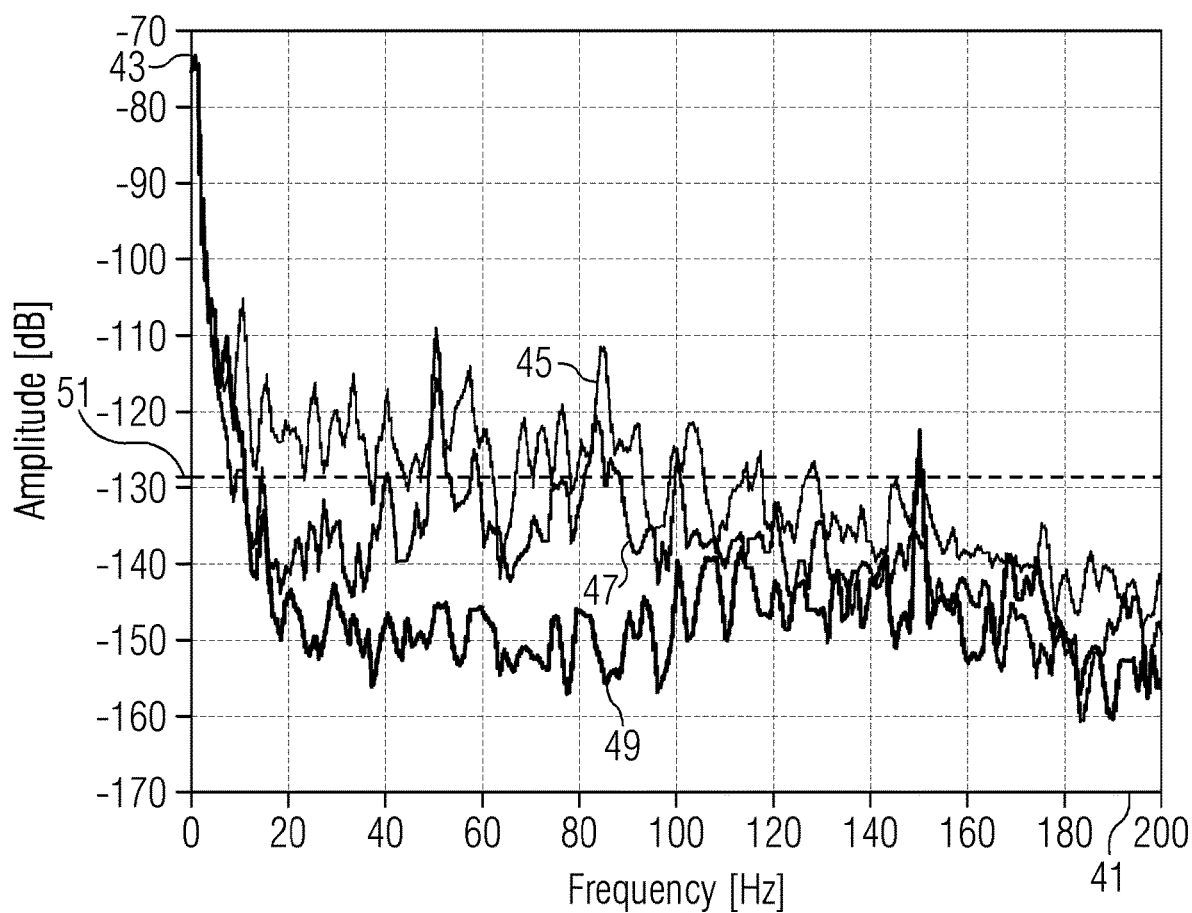
Figure 9:
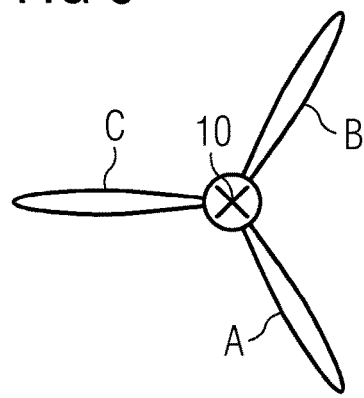
Figure 10:
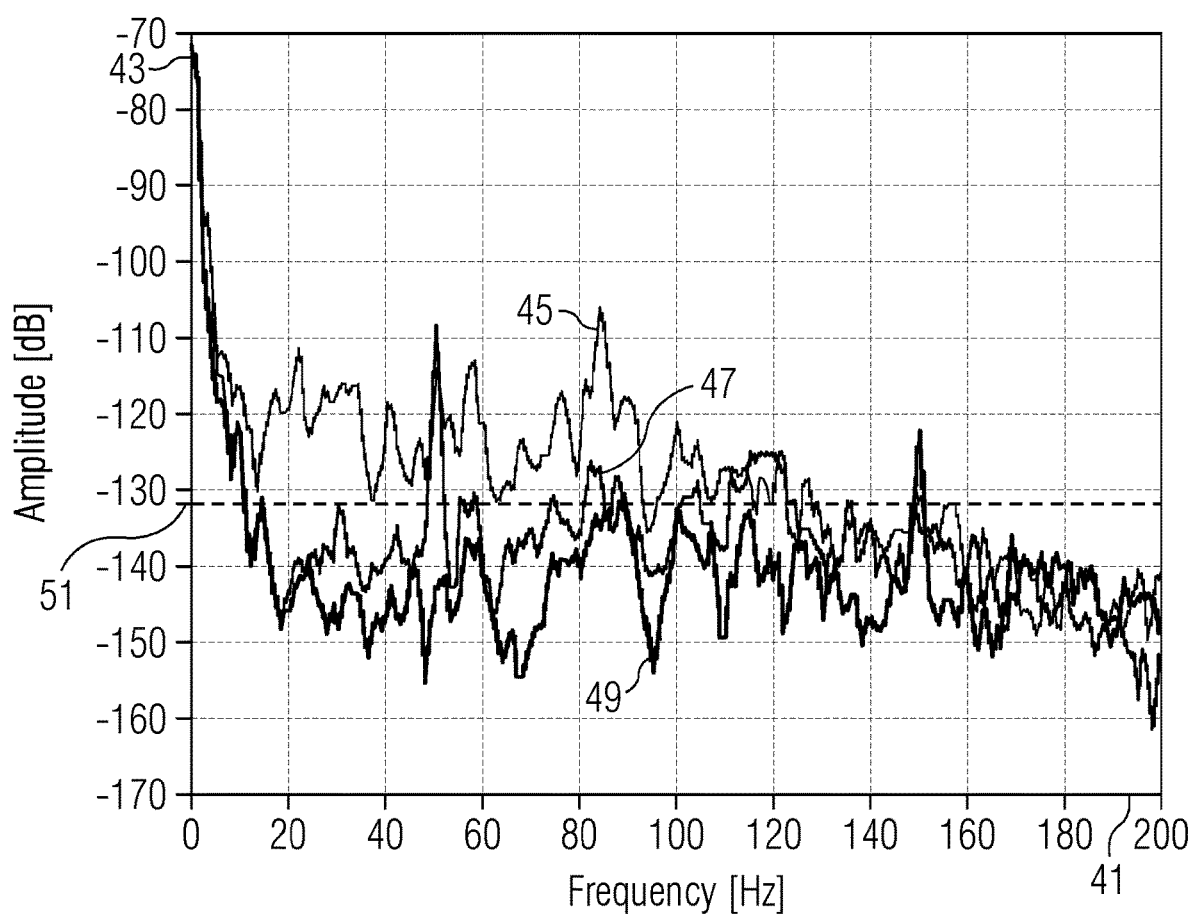
FIG. 10 illustrates a graph showing measured vibrations of the rotor blades as oriented according to FIG. 9.

FIG. 2 schematically illustrates (in a side view along the longitudinal axis 15 of the rotor blade) a blade bearing 17 according to an embodiment of the present invention which may for example be comprised in the wind turbine 1 to rotatably connect the airfoil 14 of the rotor blade 13 to the hub 11 allowing to pitch the air foil 14 of the rotor blade 13 around its longitudinal axis 15. The rotor blade bearing 17 comprises an outer ring 19, an inner ring 21 and plural rollable elements 23 arranged between the inner ring 21 and the outer ring 19, allowing to rotate the inner ring 21 with respect to the outer ring 21 around the longitudinal axis 15. In between the inner ring 19 and the outer ring 19 and around the rollable element 23, a lubricant 25 may be arranged. Further, optionally, the rollable elements 23 may be supported with a not illustrated cage.

The rotor blade bearing 17 further comprises at least one accelerometer, in the illustrated embodiments two accelerometers 27 and 29 which are mounted at the inner ring 21 at opposing positions for measuring an amount of vibration of the rotor blade bearing 17 during a method for monitoring the blade pitch bearing 17 of the rotor blade 13 according to an embodiment of the present invention. The blade pitch bearing 17 may alternatively or additionally also comprise further accelerometers or optional accelerometers 31 and 33 which may be mounted at the outer ring 19, for example in opposing positions.

The accelerometers 27, 29, 31, 33 are configured to measure vibrations of the blade pitch bearing 17 and output measurement signals commonly labelled as signals 37 which are provided to an arrangement 38 for monitoring the blade pitch bearing 17 according to an embodiment of the present invention which is also illustrated in FIG. 1 arranged within the nacelle 5. The accelerometers 27, 29, 31 and 33 are commonly labelled with reference sign 28 in FIG. 1.

According to an embodiment of the present invention, the monitoring method comprises pitching the rotor blade 13 which may be fixedly connected to the inner ring 21 of the blade pitch bearing 17 (or to the outer ring 19), wherein pitching includes to rotate the inner ring 21 (or in general the air foil 14 of the rotor blade 13) around the longitudinal axis 15 as indicated in FIG. 2 and in FIG. 1 in a rotation direction 39. During pitching the rotor blade 13, the amount of vibration of the blade pitch bearing is measured using the at least one accelerometer 28 and the measurement signal 37 is output. Based on the measured amount of vibration (represented by the measurement signal 37), the condition of the blade pitch bearing 17 is estimated. Therefore, the arrangement 38 is utilized, wherein the arrangement comprises a pitching system 30 adapted to pitch the rotor blade 13, a vibration sensor 28 which is adapted to measure the amount of vibrations and comprising a processor 40 adapted to estimate the condition of the blade pitch bearing 17 based on the measured amount of vibration 37.

FIGS. 4, 6, 8 and 10 illustrate plots of measured vibrations for rotor blades A, B and C when in the azimuthal positions as indicated in FIGS. 3, 5, 7 and 9, respectively. Thereby, the vibration was measured for one of the rotor blades A, B, C while the two others were not pitching. The illustrations in FIGS. 3, 5, 7 and 9 is along the rotor axis 10 of the rotor 9 as illustrated in FIG. 1 and perpendicular to respective longitudinal axes 15 of the rotor blades A, B, C. The configurations illustrated in FIGS. 3, 5, 7 and 9 correspond to four different azimuthal positions of the rotor blade A for which condition monitoring of its rotor blade pitch bearing 17 is performed.

The abscissas 41 in FIGS. 4, 6, 8 and 10 indicate the frequency of the vibration, while the ordinates 43 indicate the amplitude of the respective frequency component of the vibrations. The vibration measured for rotor blade A is depicted with the curve 45, the rotation of the blade B is depicted with a curve 47 and the vibration of the curve C is depicted with a curve 49.

Inspection of the rotor blade A had uncovered that the blade A has a damage in the raceway system of its rotor blade bearing. In particular, the lubricant or grease 25 between the inner ring 21 and the outer ring 19 of the blade bearing 17 of rotor blade A had been found to be black and had shown metal debris, potentially from the raceways 20 and/or 22 of the outer ring 19 or the inner ring 21 and/or from the rollable elements 23.

As can be appreciated from FIGS. 4, 6, 8 and 10, the curves 45 in these graphs showing the vibrations of the rotor blade A are different for the different azimuthal positions. According to an embodiment of the present invention, for each of the azimuthal positions, an azimuthal position dependent threshold 51 may be defined. If the measured vibration of a rotor pitch bearing to be monitored is above the azimuthal position depending threshold 51 in a particular frequency range, the respective rotor blade pitch bearing may be considered or diagnosed to have a particular degree of damage.

As can be appreciated from FIGS. 4, 6, 8 and 10, the vibration 45 measured for the rotor blade A is for almost all frequencies within a frequency band of 0 to 100 Hz above the respective threshold 51, while the vibrations of the other (not damaged) blades B and C (corresponding to curves 47 and 49) are mostly below the respective thresholds 51. Thus, analyzing the vibrations of the rotor blade bearing in a particular frequency range in an azimuthal position dependent manner comparing to a threshold is a suitable method for condition monitoring of the respective pitch bearing. Instead of a fixed threshold a so-called Warning Mask (e.g. band of critical intensity of frequency components) may be applied on top of the spectra.

Thus, according to an embodiment of the present invention, the vibration monitoring of the blade bearings is based on vibration recordings during so-called full-pitch sequences (or nearly full-pitch) where each individual blade including blade bearing is turned close to 90° during a time span of for example 10 s (in practice the blade may be turned from a pitch angle of approximately 0° to 90°). During the pitching, the wind turbine may be in a "no production" state during these pitching sequences and the rotor of the wind turbine may either be idling slowly (typically 0-3 rpm) or may be braked. Conventional current wind turbines may have already periodic full-pitch sequences incorporated as standard for the purpose to improve the blade bearing lubrication and prevent standstill marks. In the present setup used for lubrication, all three blades are turned at the same time. For blade bearing monitoring it may be beneficial to do the full pitch sequence for one blade at the time in order to reduce vibration influence from the other blade bearings—by this a more clear trend may be obtained for every single blade bearing.

Compared to normal pitching activity during operation which may typically be very small adjustments in the range of 0-2°, the full-pitch sequence is time-wise much longer in duration and much more rolling may take place inside the bearing which may increase the excitation of structural vibrations due to potential damages on rollers and raceways. The longer duration may make it possible to use vibration recordings as proposed according to embodiments of the present invention.

The longer pitching time obtained during the full pitch sequence may not be sufficient alone to give a good basis for the vibration monitoring. Information about the loading on the blade bearing may be essential—the loading may to a large extent be the gravity loading, wind loading may be minor. Therefore, at least the mean rotor azimuthal position during each "full-pitch sequence" may be recorded and connected (e.g. associated) to the vibration recording as a "binning parameter". The method of using for example the rotor azimuthal position as a parameter may be called "condition based binning" (for example the rotor position has been in the rotor azimuthal bin "45°-90°" during the vibration recording). Analysis and related trending of vibrations for each blade bearing may therefore be done for every rotor azimuthal bin. If more binning parameters are attached to obtain even more identical load conditions, for example wind speed, then the binning may be referred to as multi-parameter binning.

As is illustrated in FIGS. 4, 6, 8 and 10, a clear sign of elevated vibration is detected for the damaged blade bearing of rotor blade A.

Figure 11:
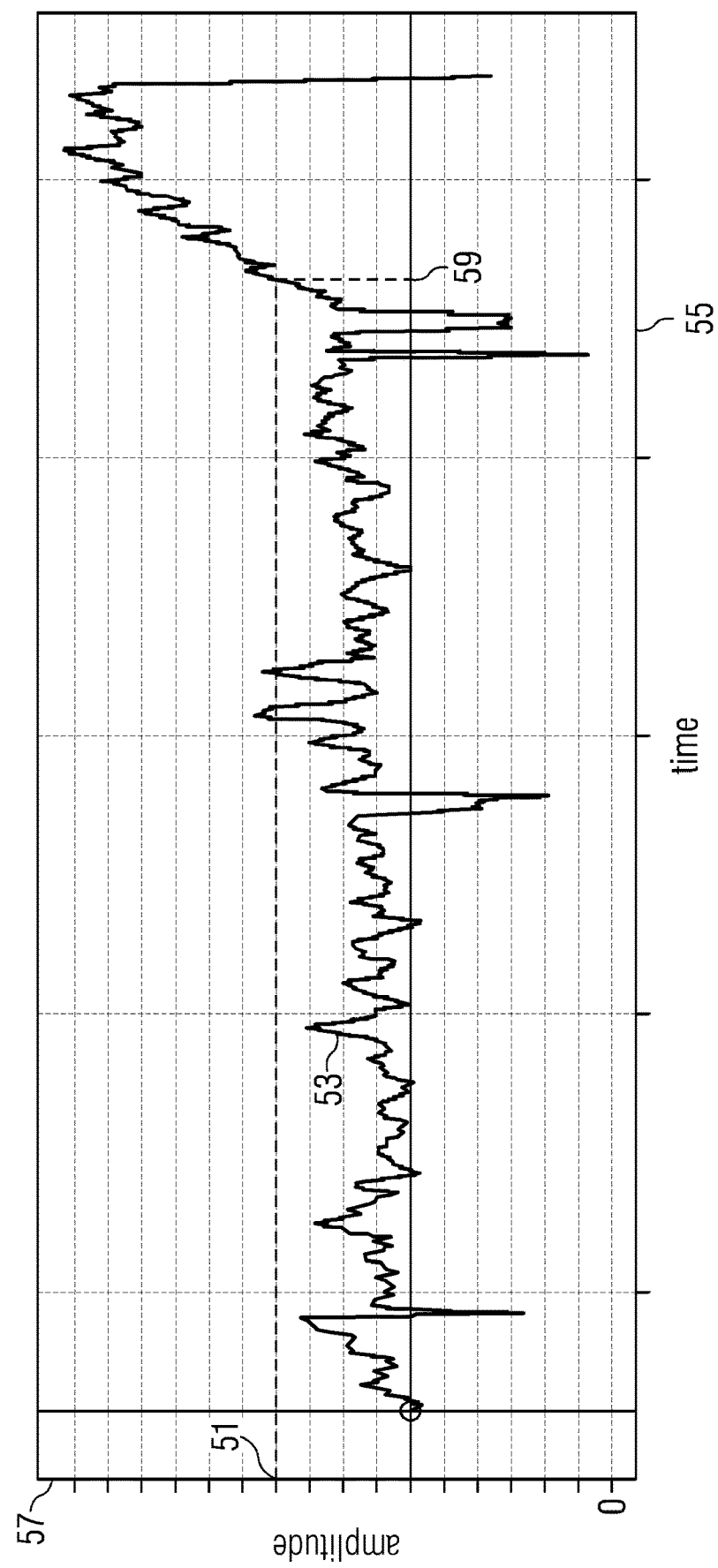
FIG. 11 illustrates a time plot considered in a method of condition monitoring.

FIG. 11 illustrates a curve 53 representing an amount of vibration of a blade pitch bearing in a coordinate system having an abscissa 55 indicating time and having an ordinate 57 indicating a magnitude of the vibration. Thereby, the curve 53 shows the temporal trend of the Fourier transform in the frequency band from 100 Hz to 140 Hz (the trending is based on a RMS value for the frequency span 100 Hz-140 Hz). It can be appreciated that there is a clear increasing tendency towards the end, where the failure was confirmed by steel particles found in grease samples and the test was terminated. In particular, a threshold 51 may be defined above which the measured vibration is considered to indicate a damage of the respective bearing. Beyond a time point 59, the measured vibration is above the threshold 51.

The vibration recordings (for example obtained by an accelerometer 28 illustrated in FIG. 1) may be analyzed in several ways. Due to the fact that the bearing is only performing a slow pitching/turning and as well not under constant rpm, it is hardly impossible to detect blade bearing damage frequencies. However, what is possible to detect may be an increased noise flow in different frequency bands. For example, the frequency band may be the band 0 to 200 Hz. Other frequency bands are possible. Other frequency ranges may for example cover an acoustic emission range (+50 kHz).

The number of accelerometers per blade bearing may be 1 or 2, for example or even more. According to another embodiment of the present invention, one single accelerometer may be placed on a good position in the hub 11 which may be able to monitor all blades of the wind turbine 1. FIG. 1 illustrates a single accelerometer 28 arranged at the hub 11 which provides the measurement signal 37. According to other embodiments, one or more accelerometers may be mounted at the respective bearing (for example at the inner ring or the outer ring) and the respective measurement signals may be supplied to the processor 40. FIG. 11 applies a very simple approach using a straight horizontal line a threshold. If one or more frequencies in the spectrum exceeds the line and do this several times, a warning may occur. FIG. 11 represents a trend curve over time for RMS-value for a frequency band (e.g. 100-140 Hz) so it is a wide frequency band in this example but can in other embodiments be almost a single frequency. The RMS-value is relative constant for a while, but suddenly it grows fast indicating a bearing damage.

Figure 12:
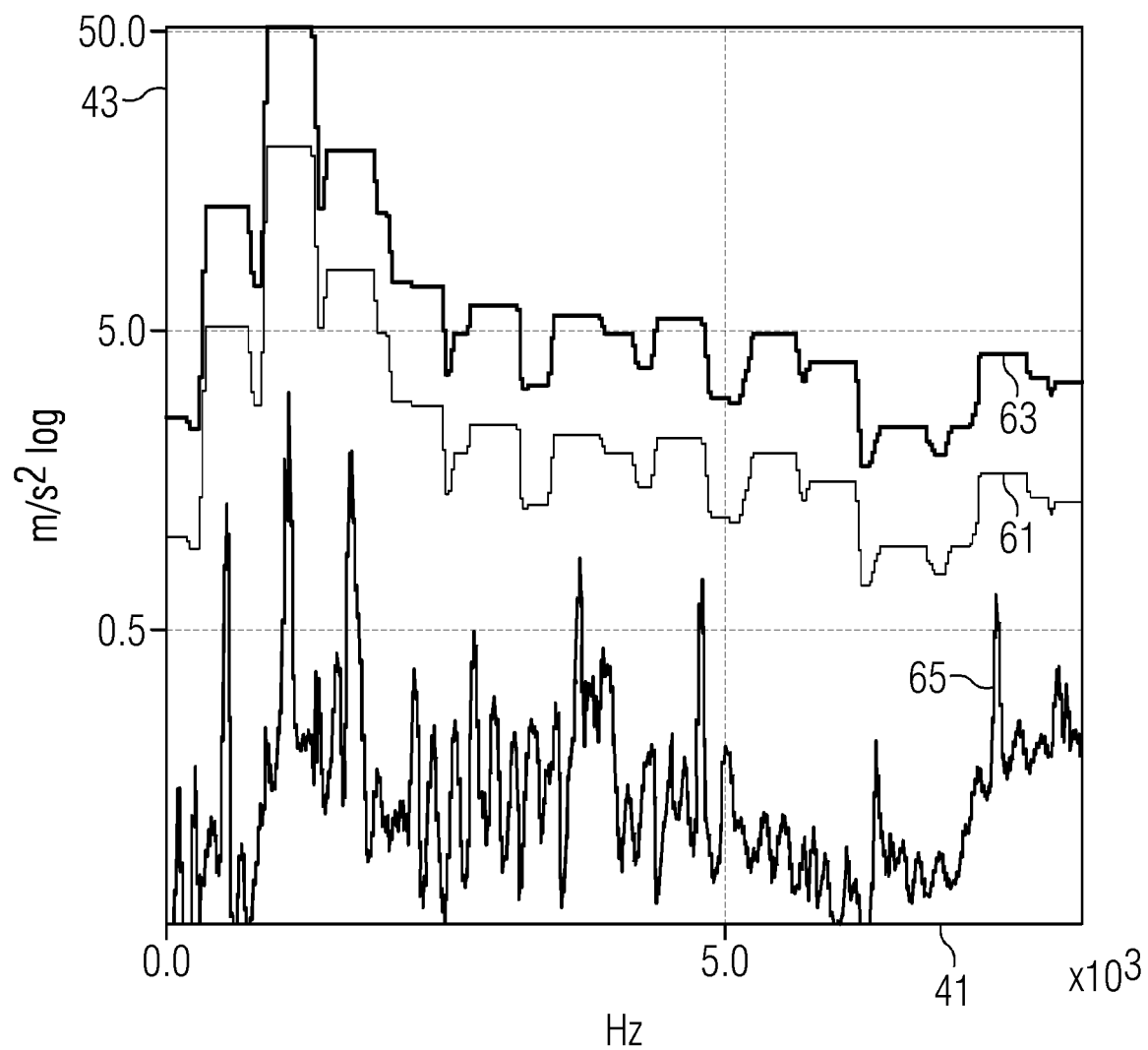
FIG. 12 illustrates measured vibration and evaluation in a method of condition monitoring.

FIG. 12 illustrates measured vibration and evaluation in a method of condition monitoring according to an embodiment of the present invention having as abscissa 41 frequency and as ordinate 43 intensity (FFT spectrum) of the vibration. The curve 65 is the FFT spectrum of the measured vibration. A first mask curve 61 (different from a horizontal line) defines plural frequency dependent thresholds of a first warning level, a second curve 63 defines plural frequency dependent thresholds a second warning level taking into account the curved nature of the spectrum e.g. coming from 50 Hz. If one or more frequencies in the spectrum exceeds the one of the lines and do this several times, a respective warning occurs.

In still other embodiments an analysis of vibration level in different frequency bands e.g. 50-100 Hz, 100-150 Hz etc may be performed according to FIG. 11 with a single horizontal threshold for all frequencies of according to FIG. 12 with different thresholds for different frequencies. The bands may be very narrow e.g. 135 Hz+−2 Hz or much wider e.g. 135 Hz+−70 Hz, depending on the application. For the specific frequency band the energy content in the vibration signal is calculated, typical the RMS-value and a warning level is calculated therefrom.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of monitoring a blade pitch bearing of a rotor blade of a wind turbine, the method comprising:
    pitching the rotor blade;
    monitoring an azimuthal position or azimuthal range in which the pitching is performed;
    measuring an amount of a vibration of the blade pitch bearing during the pitching; and
    estimating a condition of the blade pitch bearing based on the measured amount of vibration, wherein the azimuthal position is taken into account in the estimating.

2. The method according to claim 1, wherein estimating the condition of the blade pitch bearing includes estimating a degree of damage or integrity of the blade pitch bearing.

3. The method according to claim 1, wherein estimating the condition includes
    comparing the amount of a vibration with a threshold.

4. The method according to claim 1, wherein a threshold amount of vibration depends on a loading the pitch bearing is subjected to during the pitching.

5. The method according to claim 1, further comprising:
    binning the amount of vibration in one or more azimuthal ranges covered during the pitching;
    comparing the amount of a vibration or amount of vibration averaged in the respective azimuthal range with a threshold dependent on the respective azimuthal position or the azimuthal range.

6. The method according to claim 1, measuring the amount of a vibration includes:
    measuring vibration over a frequency range, in particular between 0 Hz and 1000 Hz, analysing the measured vibration over the frequency range, to determine magnitudes of vibration components of vibration for plural vibration frequencies, by Fourier transformation of a measured vibration.

7. Method according to claim 1, wherein estimating the condition comprises:
averaging magnitudes of the vibration components over a predetermined frequency range,
wherein the frequency range is between 0 Hz and 100 Hz or between 100 Hz and 140 Hz, and
wherein the frequency range includes at least one resonance frequency of the pitch bearing.

8. The method according to claim 1, wherein pitching the blade is performed while the rotor rotates with a rotational speed less than a threshold rotational speed of 3 rpm or stands still.

9. The method according to claim 1, wherein pitching the blade includes pitching the pitch angle across an angle range, between 0° and 90°, for a duration between 5 s and 50 s,
the method further comprising:
averaging the measured vibration over the duration;
associating the averaged vibration with an azimuthal bin in which an average azimuthal position covered during the pitching across the angle range is included.

10. The method according claim 1, wherein pitching the rotor blade in a pitch angle range is performed a plurality of times and the measured vibration are averaged.

11. The method according to claim 1, wherein pitching the rotor blade includes fixing pitch angles of all other blades in the wind turbine.

12. The method according to claim 1, wherein the amount of a vibration is measured using at least one accelerometer arranged:
at a hub of a rotor at which the rotor blade is mounted, and/or
at the blade pitch bearing on an inner ring or at an outer ring of the bearing.

13. An arrangement for monitoring a blade pitch bearing of a rotor blade of a wind turbine, the arrangement comprising:
a pitching system adapted to pitch the rotor blade;
a vibration sensor adapted to measure an amount of a vibration of the blade pitch bearing during the pitching;
a processor adapted to estimate a condition of the blade pitch bearing based on the measured amount of vibration taking into account an azimuthal position or azimuthal range during the pitching.

14. A wind turbine, comprising:
at least one rotor blade having a rotor blade bearing including:
an inner ring;
an outer ring;
plural rollable elements arranged between the inner ring and the outer ring, allowing to rotate the inner ring with respect to the outer ring;
at least one accelerometer arranged at the inner ring and/or at the outer ring; and
an arrangement according to claim 13.

15. A rotor blade bearing for a rotor blade of a wind turbine, comprising:
an inner ring;
an outer ring;
plural rollable elements arranged between the inner ring and the outer ring, allowing to rotate the inner ring with respect to the outer ring;
a plurality of accelerometers arranged at one or both of the inner ring and the outer ring, wherein the plurality of accelerometers includes two accelerometers mounted on at least one of the inner ring and the outer ring at opposing positions.

16. The rotor blade bearing of claim 15, wherein the plurality of accelerometers includes two accelerometers mounted on each of the inner ring and the outer ring at opposing positions.

* * * * *